2,854,413
PHOSPHORS

Charles Gerald Geary, Towanda, Pa., assignor to E. I. du Pont de Nemours and Company, Wilmington, Del., a corporation of Delaware No Drawing. Application August 13, 1953
Serial No. 374,119

10 Claims. (Cl. 252—301.6)

This invention relates to the preparation of coated phosphors. More particularly it relates to the preparation of coated phosphors having good adhesive properties. Still more particularly it relates to zinc sulfide and zinc-cadmium sulfide phosphors bearing a coating of a basic magnesium carbonate and to their preparation and to processes of settling thin layers of such coated phosphors onto glass surfaces.

An object of this invention is to provide coated zinc sulfide and zinc cadmium sulfide phosphors which have improved "wet adhesion." Another object is to provide such coated phosphors from economical and readily available materials. A further object is to provide such coated phosphors which can be settled from aqueous solutions onto the face of television and like tubes and will have adequate wet adherence and dry adherence. Still other objects will be apparent from the following description of the invention.

Zinc sulfide type phosphors, i. e., zinc sulfide or zinc-cadmium sulfide phosphors which are used in cathode ray tubes for television purposes generally have particle sizes ranging from about 2 to 50 microns, with an average particle size of 5 to 15 microns. They are usually applied to the surface of such a tube from an aqueous solution or dispersion which also contains potassium silicate and an electrolyte to cause gel formation. The dispersion is allowed to settle and the water removed by tilting and decanting. The silicate acts as a mortar and while the wet anchorage is not always adequate, when the layer is dried the adhesion is strong.

The foregoing objects are attained in accordance with this invention by applying to the surface of zinc sulfide type phosphor particles a thin coating of magnesium carbonate and then heating the coated particles to a temperature of at least 700° F. for a period of at least one hour. The resulting coated phosphors when admixed with water and an alkali metal silicate, e. g., sodium silicate or potassium silicate and an electrolyte, e. g., barium nitrate, barium acetate, acetic acid and potassium acetate, have better settling properties and enhanced wet adherence to television tubes as compared with uncoated phosphors similarly admixed.

In a practical procedure magnesium carbonate is precipitated on the surface of zinc sulfide or zinc-cadmium sulfide phosphors so as to provide an amount from 0.5 to 10% and preferably 2% to 7% by weight of $MgCO_3$ on the surface of the particles. The coated particles are then heated to a temperature of 700° F. to 900° F., preferably 705° F. to 750° F., for a period of 40 minutes to two hours or more. With the lower amounts of $MgCO_3$ about 1.5% to 3.0% by weight of strontium carbonate can be added to make a total amount of about 6.0% of metal carbonate. The magnesium carbonate coating is apparently converted to a basic magnesium $MgO \cdot MgCO_3$ or $3MgO \cdot MgCO_3$. Both of such basic magnesium carbonates are stable compounds at temperatures within the range employed. The zinc sulfide and zinc-cadmium sulfide phosphors coated in accordance with this invention may be activated with any of the usual activating metals, e. g., silver, copper and mixtures thereof.

A television tube can be provided with a phosphor screen of the coated phosphors by a procedure as follows: A layer of water which may also contain potassium silicate is introduced into the tube. A suspension in water of the above coated phosphors is mixed with potassium silicate and a suitable electrolyte, e. g., barium nitrate, barium acetate, acetic acid and potassium acetate, and poured into the tube. The phosphor particles are allowed to settle, the liquid removed by decanting and the phosphor layer is dried, e. g., by means of a current of air.

The invention will be further illustrated but is not intended to be limited by the following examples.

Example I

To 600 grams of a silver-activated zinc sulfide phosphor containing particles ranging in size from 2 to 50 microns with an average particle size of 9 microns, there was added 130 ml. of water and 270 ml. of magnesium chloride solution containing 175 grams $MgCl_2$ per liter. The dispersion was stirred vigorously and 270 ml. of 2 molar ammonium carbonate solution was added slowly with stirring. The coated phosphor particles were filtered, washed twice with 600 ml. portions of water, dried for 16 hours at 275° F. and the dried particles were rolled lightly to break up aggregates. The particles were fired for a period of one hour at 705° F. and sieved through 325 mesh metal screen. The phosphor particles had a coating consisting essentially of basic magnesium carbonate which coating constituted about 6.8% of the weight of the coated phosphor. The phosphor particles were tested to determine their utility for coating onto the surface of a television tube in the following manner:

To 2.5 ml. of barium nitrate, containing 16.7 grams per liter of $Ba(NO_3)_2$, was added sufficient distilled water to make 118 ml. This was poured into a transparent plastic (poly(methyl methacrylate)) settling vessel 55 mm. square and approximately 64 mm. high, in the bottom of which had been placed a glass slide approximately 51 mm. square. To this "cushion" was added a suspension of 120 mg. of phosphor in a solution prepared by diluting 1 ml. of 28% potassium silicate to 32 ml. with distilled water. After allowing fifteen minutes for the phosphor to settle, the wet strength of the deposited layer was measured by subjecting it to the action of a submerged hydraulic jet. (This method is well known to those versed in the art of television tube manufacture, and has been described in a paper by D. J. Bracco and W. R. Watson presented before The Electrochemical Society, at Detroit, Michigan, on October 12, 1951.) The size of the spot produced by the jet is in inverse relation to the adhesion of the phosphor to the glass, and the wet strength is expressed in terms of that of an untreated phosphor used as a control, by the following formula:

$$\text{Relative wet strength} = \frac{\text{Spot size of control phosphor} \times 100}{\text{Spot size of treated phosphor}}$$

The amount of phosphor used in this test is chosen to give a coating weight of approximately 4 mg. per square centimeter. The concentrations of potassium silicate and electrolyte are such as to give 0.187% potassium silicate and .028% barium nitrate in the total settling solution. Five samples of screens on glass slides were tested to determine their wet adherence and they were compared with a control silver-activated, zinc sulfide phosphor containing no magnesium oxide coating. The wet adherence of the coated phosphor showed a wet strength of 146% as compared with a control sample of the phosphor having no basic magnesium carbonate coating which control had a wet strength of 100%.

*Example II*

A zinc sulfide-cadmium sulfide phosphor was treated in the same manner as described in Example II and tested for utility in a television tube, as described in that example. The wet adherence of a layer made from the basic magnesium carbonate coated phosphor showed 120% greater wet strength as compared with a layer made from an uncoated control sample of the same phosphor which control had a wet strength of 100%.

*Example III*

To 227 grams of a zinc sulfide phosphor of the type given in Example I there was added 122 ml. of water and 122 ml. of a 5% solution of $SrCl_2 \cdot 6H_2O$. To the resulting suspension there was added with stirring 12 cc. of 2 molar ammonium carbonate. After 15 minutes, 8 ml. of magnesium chloride (175 grams $MgCl_2$ per liter) was added with stirring. The treated phosphor which had a coating containing approximately 1.5% $SrCO_3$ and 0.5% $MgCO_3$ by weight was filtered off and washed with two 250 ml. portions of water. The particles were dried, rolled to remove aggregates as described in Example I, fired at 750° F. for one hour and then sieved. The coating consisted of a mixture of $SrCO_3$ and $MgO \cdot MgCO_3$. A glass slide was provided with a coating of the phosphor after the manner described in Example I and it showed a wet strength of 213% as compared with a layer made in a similar manner from a control sample of the same phosphor free from the applied coating, which control had a wet strength of 100%.

It is preferable to use ammonium carbonate as the precipitating agent when precipitating the carbonate or mixture of magnesium carbonate and strontium carbonate onto the phosphor particles because any ammonium salts remaining after washing are completely volatilized from the phosphors during subsequent heat treatment. However, the invention is not limited to the use of the ammonium salt because other soluble carbonates are equally effective as precipitating agents. Among the suitable carbonates which can be substituted in like manner are sodium carbonate, potassium carbonate and lithium carbonate.

Similarly, in place of the magnesium chloride of the foregoing examples there may be substituted other soluble salts of magnesium, e. g., magnesium sulfate, magnesium acetate, magnesium bromide and magnesium nitrate. Mixtures of two or more of the foregoing salts can be used. The corresponding strontium salts, except for strontium sulfate, can be used in place of the strontium chloride of the above example.

The novel phosphors of this invention are useful in the manufacture of various types of cathode ray tubes including tubes for radar apparatus and oscilloscopes and are particularly useful in the manufacture of cathode ray tubes for television purposes. Television tubes made with these treated phosphors, in many instances, have improved resistance to darkening under electron bombardment.

An advantage of the invention resides in the fact that the phosphors readily settle from aqueous suspension onto various surfaces. The have adequate wet adhesion to glass surfaces when applied from aqueous suspension by settling procedures. Since the layers of phosphor show improved wet strength, the efficiency of television tube coating processes is materially increased and the number of unsatisfactory tubes materially reduced.

The embodiments of the invention in which an exclusive property or privilege is claimed are defined as follows:

1. Finely divided zinc sulfide phosphors having particle sizes ranging from 2 to 50 microns, said particles having a thin surface coating comprising magnesium basic carbonate in an amount corresponding to from 0.5% to 10.0% by weight of the phosphors.

2. Finely divided zinc-cadmium sulfide phosphors having particle sizes ranging from 2 to 50 microns, said particles having a thin surface coating comprising magnesium basic carbonate in an amount corresponding to from 0.5% to 10.0% by weight of the phosphors.

3. Finely divided zinc sulfide phosphors having particle sizes ranging from 2 to 50 microns, said particles having a thin surface coating composed of metal carbonates in an amount about 6.0% by weight of the phosphors of which amount 3.0% to 4.5% corresponds to magnesium carbonate and 3.0% to 1.5% is strontium carbonate.

4. The process which comprises precipitating magnesium carbonate onto the surface of finely divided particles of a zinc sulfide type phosphor taken from the group consisting of zinc sulfide and zinc-cadmium sulfide phosphors, said magnesium carbonate being used in an amount from 0.5% to 10.0% by weight of the phosphor, and heating the coated particles to a temperature of at least 700° F. for a period of at least one hour.

5. The process which comprises precipitating magnesium carbonate onto the surface of finely divided particles of a zinc sulfide type phosphor taken from the group consisting of zinc sulfide and zinc-cadmium sulfide phosphors, said magnesium carbonate being used in an amount from 0.5% to 10.0% by weight of the phosphor, and heating the coated particles to a temperature from 700° F. to 900° F. for a period of forty minutes to two hours.

6. The process which comprises precipitating magnesium carbonate onto the surface of finely divided particles of a zinc sulfide phosphor, said magnesium carbonate being used in an amount from 0.5% to 10.0% by weight of the phosphor, said particles ranging in sizes from 2 to 50 microns, and heating the coated particles to a temperature from 700° F. to 900° F. for a period of forty minutes to two hours.

7. The process which comprises precipitating magnesium carbonate onto the surface of finely divided particles of a zinc sulfide phosphor, said magnesium carbonate being used in an amount from 0.5% to 10.0% by weight of the phosphor, said particles ranging in sizes from 2 to 50 microns, and heating the coated particles to a temperature from 705° to 750° F. for a period of forty minutes to two hours.

8. The process which comprises precipitating magnesium carbonate onto the surface of finely divided particles of a zinc-cadmium sulfide phosphor, said magnesium carbonate being used in an amount from 0.5% to 10.0% by weight of the phosphor, said particles ranging in sizes from 2 to 50 microns, and heating the coated particles to a temperature from 700° F. to 900° F. for a period of forty minutes to two hours.

9. The process which comprises dispersing finely divided particles of a zinc sulfide phosphor in an aqueous solution, admixing an aqueous magnesium chloride solution corresponding to magnesium carbonate in an amount from 0.5% to 10.0% by weight of the phosphor, adding an aqueous ammonium carbonate solution, filtering the coated particles, washing the filtered particles, drying the washed particles and heating the dried particles to a temperature from 700° F. to 900° F. for a period of forty minutes to two hours.

10. The process which comprises precipitating magnesium carbonate onto finely divided particles of a zinc sulfide type phosphor taken from the group consisting of zinc sulfide and zinc-cadmium sulfide phosphors, said magnesium carbonate being used in an amount from 0.5% to 10.0% by weight of the phosphor, drying the coated particles, heating the dried particles to a temperature between 700° F. and 900° F. for a period of forty minutes to two hours, forming an aqueous dispersion of the coated phosphor particles in a potassium silicate solution and settling said dispersion through a layer of water containing an electrolyte onto the surface of a cathode ray tube.

References Cited in the file of this patent

UNITED STATES PATENTS

| | | |
|---|---|---|
| 2,421,208 | Leverenz | May 27, 1947 |
| 2,487,097 | Byler | Nov. 8, 1949 |
| 2,662,830 | Darlaston | Dec. 15, 1953 |
| 2,684,306 | Brewer et al. | July 20, 1954 |
| 2,697,668 | Crosby | Dec. 21, 1954 |

UNITED STATES PATENT OFFICE
CERTIFICATE OF CORRECTION

Patent No. 2,854,413                                          September 30, 1958

Charles Gerald Geary

It is hereby certified that error appears in the printed specification of the above numbered patent requiring correction and that the said Letters Patent should read as corrected below.

Column 2, line 4, after "magnesium" insert -- carbonate during the heating treatment. It may be either --.

Signed and sealed this 16th day of December 1958.

(SEAL)
Attest:

KARL H. AXLINE
Attesting Officer

ROBERT C. WATSON
Commissioner of Patents